United States Patent
Ikeda

(10) Patent No.: US 11,934,563 B2
(45) Date of Patent: Mar. 19, 2024

(54) ANOMALY DETECTION APPARATUS, ANOMALY DETECTION METHOD, AND COMPUTER-READABLE MEDIUM

(71) Applicant: NEC Corporation, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 241 days.

(21) Appl. No.: 17/431,841

(22) PCT Filed: Feb. 22, 2019

(86) PCT No.: PCT/JP2019/006790
§ 371 (c)(1),
(2) Date: Aug. 18, 2021

(87) PCT Pub. No.: WO2020/170425
PCT Pub. Date: Aug. 27, 2020

(65) Prior Publication Data
US 2022/0147658 A1 May 12, 2022

(51) Int. Cl.
*G06F 17/00* (2019.01)
*G06F 7/00* (2006.01)
*G06F 16/22* (2019.01)
*G06F 21/64* (2013.01)

(52) U.S. Cl.
CPC .......... *G06F 21/64* (2013.01); *G06F 16/2246* (2019.01)

(58) Field of Classification Search
CPC ............................. G06F 21/64; G06F 16/2246

USPC ........................................................ 707/690
See application file for complete search history.

(56) References Cited

U.S. PATENT DOCUMENTS

| 10,045,218 | B1 | 8/2018 | Stapleton et al. |
| 2015/0078654 | A1* | 3/2015 | Chaudhury ............ G06V 20/46 |
| | | | 382/159 |
| 2017/0199902 | A1* | 7/2017 | Mishra ..................... G06N 5/01 |
| 2019/0173902 | A1 | 6/2019 | Takahashi et al. |
| 2019/0378010 | A1* | 12/2019 | Morris .................. G06F 16/288 |
| 2019/0378049 | A1* | 12/2019 | Widmann .......... G06Q 20/4016 |

FOREIGN PATENT DOCUMENTS

| JP | 2018-092613 A | 6/2018 |
| JP | 2019-020124 A | 2/2019 |

OTHER PUBLICATIONS

International Search Report for PCT Application No. PCT/JP2019/006790, dated May 7, 2019.

* cited by examiner

*Primary Examiner* — Pavan Mamillapalli

(57) ABSTRACT

An anomaly detection apparatus according to an embodiment of the present disclosure includes: a global tree structure creation unit configured to create a global tree structure for dividing a plurality of data pieces into a plurality of groups, a local tree structure creation unit configured to create a local tree structure for further dividing the data pieces divided into the plurality of groups for each of the plurality of groups, and a score calculation unit configured to calculate a score indicating an anomaly level of the plurality of data pieces using a depth from a root node to a leaf node of the local tree structure.

9 Claims, 11 Drawing Sheets

| TIME | DOMAIN | METHOD | PATH | RESPONSE CODE | NUMBER OF TRANS-MISSION BYTES | NUMBER OF RE-CEPTION BYTES | CLIENT IP |
|---|---|---|---|---|---|---|---|
| 10:00:00 | d1 | GET | / | 200 | 0 | 30000 | 10.10.0.1 |
| 10:00:30 | d1 | GET | /icon.png | 200 | 0 | 30000 | 10.10.0.1 |
| 10:05:00 | d2 | GET | /index.html | 200 | 0 | 40000 | 10.10.0.2 |
| 10:05:00 | d2 | GET | /index.css | 404 | 0 | 50000 | 10.10.0.2 |
| 10:10:00 | d10 | POST | /send.php | 200 | 100000 | 100 | 10.10.0.3 |
| 11:15:00 | d11 | POST | /x.aspx | 200 | 1000 | 1000 | 10.10.0.4 |
| 10:20:00 | d10 | GET | /test.php | 200 | 0 | 1000 | 10.10.0.3 |
| ... | | | | | | | |

Fig. 8

| DOMAIN | POST RATE | NUMBER OF ACCESSES |
|---|---|---|
| d1 | 0.0 | 110 |
| d2 | 0.0 | 2 |
| d3 | 0.0 | 4 |
| d4 | 0.0 | 120 |
| d5 | 0.0 | 6 |
| d6 | 0.0 | 8 |
| d7 | 0.0 | 10 |
| d8 | 0.0 | 140 |
| d9 | 0.0 | 12 |
| d10 | 0.8 | 5 |
| d11 | 1.0 | 100 |
| d12 | 1.0 | 8 |

Fig. 9

ANOMALY DETECTION APPARATUS, ANOMALY DETECTION METHOD, AND COMPUTER-READABLE MEDIUM

This application is a National Stage Entry of PCT/JP2019/006790 filed on Feb. 22, 2019, the contents of all of which are incorporated herein by reference, in their entirety.

TECHNICAL FIELD

The present disclosure relates to an anomaly detection apparatus, an anomaly detection method, and a computer-readable medium, and more particularly to an anomaly detection apparatus, an anomaly detection method, and a computer-readable medium capable of calculating a score indicating an anomaly level of data.

BACKGROUND ART

The recent development of the information society has increased the importance of cybersecurity. For example, in the field of cybersecurity, it is important to detect unusual data (outliers) in order to detect an anomaly in the data. Isolation Forest is used as one of algorithms used to detect such outliers.

Patent Literature 1 discloses an anomaly detection technique used in an in-vehicle network or the like. In the technique disclosed in Patent Literature 1, an anomaly of a network is detected using the Isolation Forest.

CITATION LIST

Patent Literature

Patent Literature 1: Japanese Unexamined Patent Application Publication No. 2018-092613

SUMMARY OF INVENTION

Technical Problem

The Isolation Forest algorithm creates a binary tree structure (a separation tree structure) using a plurality of data pieces, and divides the plurality of data pieces using the binary tree structure. The Isolation Forest algorithm uses a path length from a root node to a leaf node as a score, and determines that the smaller the score (the shallower the depth), the more likely the data is to be an outlier (abnormal data).

However, when the Isolation Forest algorithm is used, there is a problem that an expected result cannot be obtained if the distribution of data is unbalanced. That is, in the Isolation Forest algorithm, features (parameters) and thresholds of data to be divided are randomly determined to create a binary tree structure. For this reason, in the case of unbalanced data including a majority data group and a minority data group, data included in the minority data group tends to be determined to be an outlier, and as a result, there is a problem that an anomaly in the data cannot be detected as expected.

In view of the above problem, an object of the present disclosure is to provide an anomaly detection apparatus, an anomaly detection method, and a computer-readable medium capable of appropriately detecting an anomaly even when a distribution of data is unbalanced.

Solution to Problem

An example aspect of the present disclosure is an anomaly detection apparatus including: a first binary tree structure creation unit configured to create a first binary tree structure for dividing a plurality of data pieces into a plurality of groups; a second binary tree structure creation unit configured to create a second binary tree structure for further dividing the data pieces divided into the plurality of groups for each of the plurality of groups; and a score calculation unit configured to calculate a score indicating an anomaly level of the plurality of data pieces using a depth from a root node to a leaf node of the second binary tree structure.

Another example aspect of the present disclosure is an anomaly detection method including: creating a first binary tree structure for dividing a plurality of data pieces into a plurality of groups; creating a second binary tree structure for further dividing the data pieces divided into the plurality of groups for each of the plurality of groups; and calculating a score indicating an anomaly level of the plurality of data pieces using a depth from a root node to a leaf node of the second binary tree structure.

Another example aspect of the present disclosure is a non-transitory computer readable medium storing a program causing a computer to execute an anomaly detection process including: creating a first binary tree structure for dividing a plurality of data pieces into a plurality of groups; creating a second binary tree structure for further dividing the data pieces divided into the plurality of groups for each of the plurality of groups; and calculating a score indicating an anomaly level of the plurality of data pieces using a depth from a root node to a leaf node of the second binary tree structure.

Advantageous Effects of Invention

According to the present disclosure, it is possible to provide an anomaly detection apparatus, an anomaly detection method, and a computer-readable medium capable of appropriately detecting an anomaly even when a distribution of data is unbalanced.

BRIEF DESCRIPTION OF DRAWINGS

FIG. 8 is a table showing an example of proxy log data;

FIG. 9 is a table showing an example of feature data;

DESCRIPTION OF EMBODIMENTS

First Example Embodiment

A first example embodiment of the present disclosure will be described below.

Figure 1:
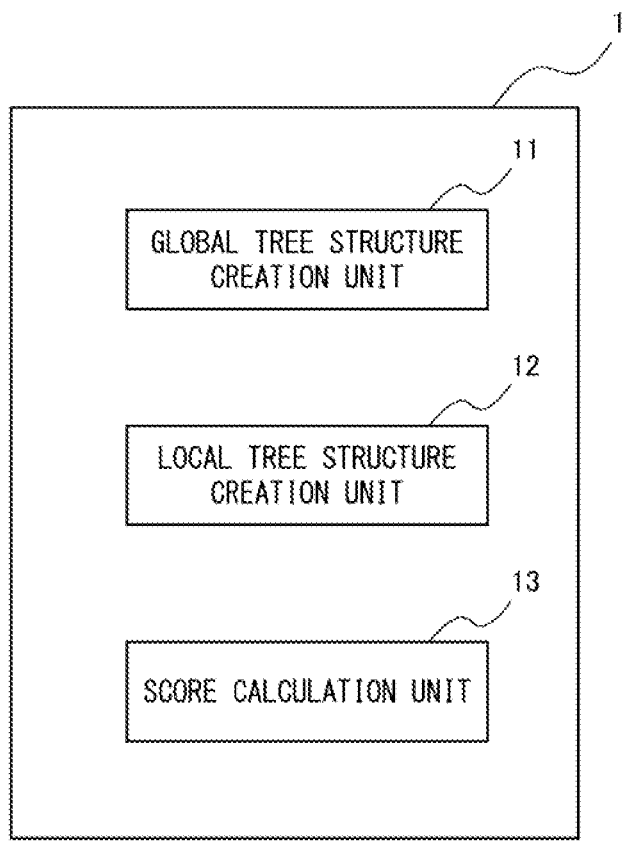
FIG. 1 is a block diagram for explaining an anomaly detection apparatus according to a first example embodiment.
Figure 2:
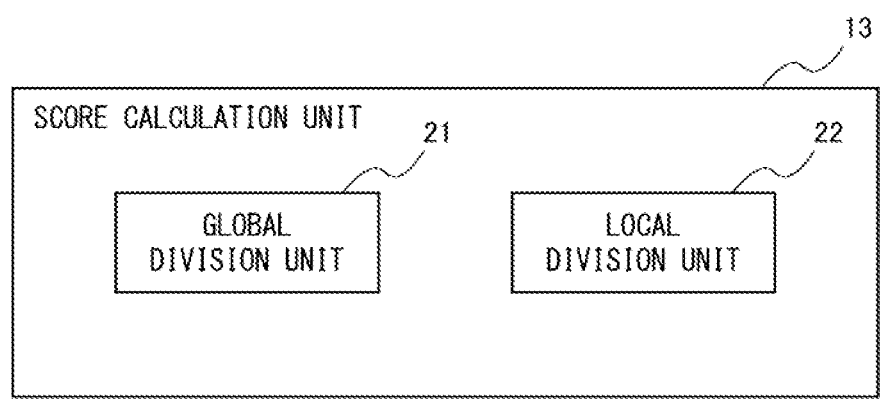
FIG. 2 is a block diagram showing a score calculation unit provided in the anomaly detection apparatus according to the first example embodiment.

FIG. 1 is a block diagram for explaining an anomaly detection apparatus according to the first example embodiment. As shown in FIG. 1, the anomaly detection apparatus 1 includes a global tree structure creation unit (a first binary tree structure creation unit) 11, a local tree structure creation unit (a second binary tree structure creation unit) 12, and a score calculation unit 13. As shown in FIG. 2, the score calculation unit 13 includes a global division unit (a first data division unit) 21 and a local division unit (a second data division unit) 22. The anomaly detection apparatus 1 according to this example embodiment detects data indicating an anomaly from a plurality of input data pieces.

The global tree structure creation unit 11 creates a global tree structure (a first binary tree structure) for dividing the plurality of data pieces into a plurality of groups. The global tree structure created by the global tree structure creation unit 11 is used when the global division unit 21 of the score calculation unit 13 divides the plurality of data pieces into the plurality of groups.

The global tree structure creation unit 11 creates the global tree structure by dividing the plurality of data pieces into the plurality of groups so that the number of data pieces belonging to each group becomes a predetermined threshold or more. At this time, the global tree structure creation unit 11 may create the global tree structure using all of the plurality of data pieces.

That is, the global tree structure creation unit 11 uses all of the plurality of data pieces as inputs and randomly selects a dimension (a parameter) and a threshold of the division to create the binary tree structure. The division may be carried out until the number of leaf nodes (the groups) of the binary tree structure created at this time becomes a specified number or until the depth of the leaf nodes (the groups) becomes a predetermined depth.

The local tree structure creation unit 12 creates a local tree structure (a second binary tree structure) for further dividing the data pieces divided into each of the plurality of groups by the global tree structure creation unit 11. Here, each leaf node (each group) of the global tree structure corresponds to a root node of the local tree structure. The local tree structure created by the local tree structure creation unit 12 is used when the local division unit 22 of the score calculation unit 13 further divides the data of each leaf node (each group) of the global tree structure.

The local tree structure creation unit 12 uses the data extracted for each group as an input, randomly selects a dimension (parameter) and a threshold of division, and creates the binary tree structure for each group. The local tree structure created by the local tree structure creation unit 12 is the same as the binary tree structure created using the Isolation Forest algorithm. The local tree structure creation unit 12 may create the local tree structure for each group using a part of data extracted at random for each group. The same number of data pieces may be extracted for each group to create the local tree structure.

The score calculation unit 13 calculates a score indicating an anomaly level of the plurality of data pieces using the depth from the root node of the local tree structure created by the local tree structure creation unit 12 to the leaf node.

More specifically, the global division unit 21 (see FIG. 2) of the score calculation unit 13 divides the input plurality of data pieces into the plurality of groups using the global tree structure created by the global tree structure creation unit 11. In other words, the global division unit 21 determines the group to which each of the plurality of data pieces belongs using the global tree structure created by the global tree structure creation unit 11.

The local division unit 22 (see FIG. 2) included in the score calculation unit 13 further divides the data divided into each of the plurality of groups into each of the groups using the local tree structure created by the local tree structure creation unit 12. In other words, the local division unit 22 determines the leaf node of the data belonging to each of the groups using the local tree structure created by the local tree structure creation unit 12.

The score calculation unit 13 calculates the depth from the root node to the leaf node of the data divided by the local division unit 22 as the score. That is, the score calculation unit 13 calculates the score using the depth of the leaf node of each of the groups determined by the local division unit 22. The score calculated at this time serves as an index indicating how much degree of outlier (anomaly) each piece of data is.

Next, an operation of the anomaly detection apparatus 1 according to this example embodiment will be described. The anomaly detection apparatus 1 according to this example embodiment first generates the binary tree structures (the global tree structure and local tree structure) using the global tree structure creation unit 11 and the local tree structure creation unit 12. After that, the plurality of data pieces which are the input data are divided using the created binary tree structures (the global tree structure and local tree structure). The score is calculated using the depth to the leaf node of the divided data piece. Hereinafter, the operation of the anomaly detection apparatus 1 according to this example embodiment will be described in detail with reference to the flowchart shown in FIG. 3 and FIGS. 4 and 5.

Figure 3:
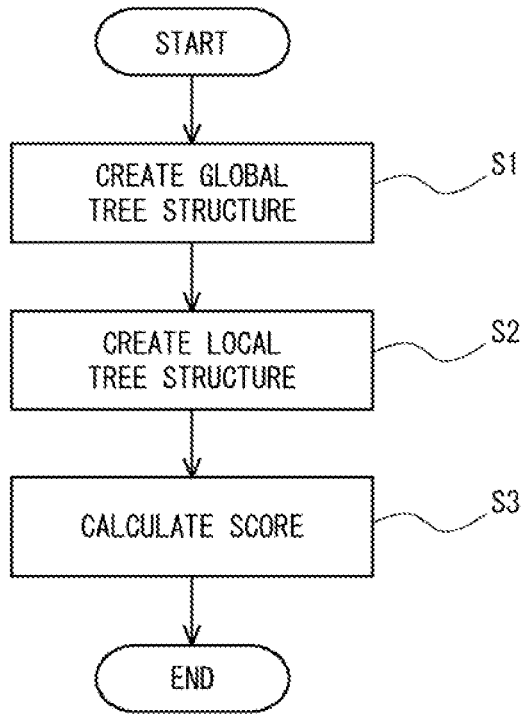
FIG. 3 is a flowchart for explaining an operation of the anomaly detection apparatus according to the first example embodiment.
Figure 4:
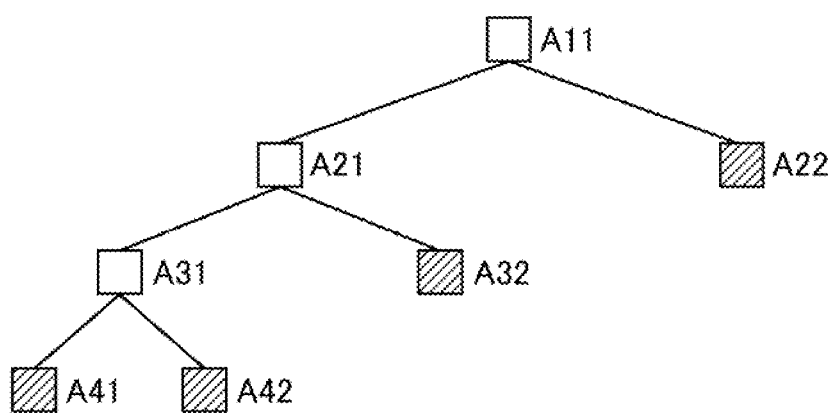
FIG. 4 is a diagram showing a global tree structure created using the anomaly detection apparatus according to the first example embodiment.

First, the global tree structure creation unit 11 creates the global tree structure for dividing the plurality of data pieces into the plurality of groups (Step S1 in FIG. 3). That is, as shown in FIG. 4, all of the plurality of data pieces are used as the inputs, and the dimension (the parameter) and the threshold of division are randomly selected to create the binary tree structure. In the example shown in FIG. 4, a node A11 branches to a node A21 and a node A22. The node A21 further branches to a node A31 and a node A32. The node A31 further branches to a node A41 and a node A42. The dimension (the parameter) and the threshold for dividing the data are set in each of the nodes A11, A21, and A31.

The global tree structure creation unit 11 performs the division until the number of leaf nodes (the groups) of the global tree structure becomes the specified number or the depth of the leaf nodes (the groups) becomes the predetermined depth. In the example shown in FIG. 4, the nodes A41, A42, A32, and A22 correspond to the leaf nodes (the groups). Therefore, the number of leaf nodes (the groups) is four. Further, since the depths of the leaf nodes A41 and A42 are "3", the depth of the leaf node A32 is "2", and the depth of the leaf node A22 is "1", the maximum depth of the leaf node of the global tree structure is "3".

At this time, the global tree structure creation unit 11 creates the global tree structure so that the number of data pieces belonging to each leaf node (group) A41, A42, A32, and A22 becomes a predetermined threshold N or more (N is a natural number of two or more). In other words, the global tree structure is created so that the number of data pieces belonging to each leaf node (group) A41, A42, A32, and A22 does not fall below the predetermined threshold. In this way, the balance of data belonging to each leaf node (group) can be maintained.

The global tree structure creation unit 11 may set an upper limit for the maximum depth of the leaf node of the global tree structure. That is, a setting may be configured so that the depth of the leaf node of the global tree structure may not become deeper than the predetermined depth. By thus setting the upper limit for the maximum depth of the leaf node, it is possible to prevent or minimize an increase in the number of leaf nodes in the global tree structure.

After that, n (n is a natural number of two or more) elements (the data pieces) are extracted at random from each leaf node (group) A41, A42, A32, and A22 of the global tree structure shown in FIG. 4. At this time, the number of data pieces to be extracted from each leaf node (group) A41, A42, A32, and A22 is preferably the same. When the number of data pieces to be extracted from each leaf node (group) A41, A42, A32, and A22 is the same in this way, it is possible to prevent or minimize the score from becoming large in a specific leaf node (group) having a large number of data pieces.

After that, the local tree structure creation unit 12 creates the local tree structure using the data extracted from the leaf nodes (groups) A41, A42, A32, and A22 of the global tree structure (Step S2 in FIG. 3). The leaf nodes (groups) A41, A42, A32, and A22 of the global tree structure shown in FIG. 4 correspond to root nodes B11, C11, D11, and E11 of the local tree structure shown in FIG. 5, respectively.

Figure 5:
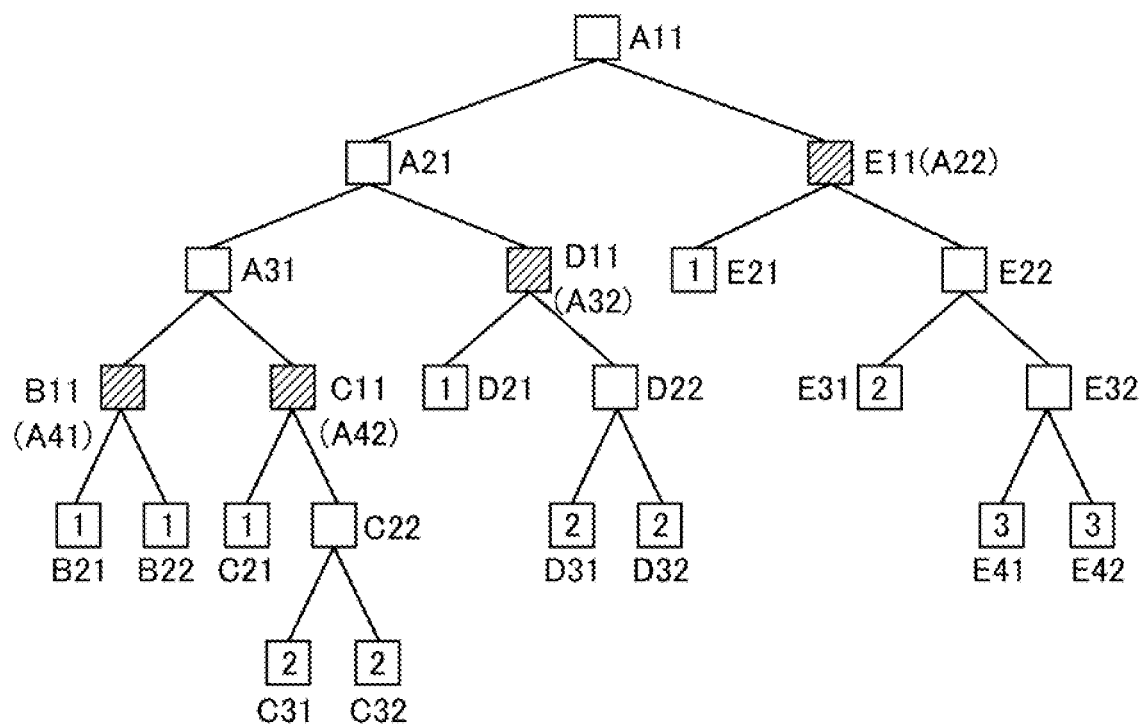
FIG. 5 is a diagram showing the global tree structure and a local tree structure created using the anomaly detection apparatus according to the first example embodiment.

As shown in FIG. 5, the root node B11 of the local tree structure is branched into a node B21 and a node B22. The root node C11 is branched into a node C21 and a node C22. The node C22 is further branched into a node C31 and a node C32. The root node D11 is branched into a node D21 and a node D22. The node D22 is further branched into a node D31 and a node D32. The root node E11 is branched into a node E21 and a node E22. The node E22 is further branched into a node E31 and a node E32. The node E32 is further branched into a node E41 and a node E42. The local tree structure creation unit 12 can create the local tree structures in this manner.

Next, the score calculation unit 13 calculates the score using the created binary tree structures (the global tree structure and local tree structure: see FIGS. 4 and 5) (Step S3 in FIG. 3). Specifically, the global division unit 21 of the score calculation unit 13 uses the global tree structure (see FIG. 4) created by the global tree structure creation unit 11 to divide the input data into the plurality of groups A41, A42, A32, A22. In other words, the global division unit 21 uses the global tree structure created by the global tree structure creation unit 11 to determine the groups A41, A42, A32, and A22 to which each of the plurality of input data pieces belongs.

After that, the local division unit 22 included in the score calculation unit 13 divides the data belonging to each of the groups A41, A42, A32, and A22 (which correspond to the root nodes B11, C11, D11 and E11 in FIG. 5, respectively) using the local tree structure (see FIG. 5) created by the local tree structure creation unit 12. For example, the local division unit 22 divides the data belonging to the root node B11 into the node B21 or the node B22. For example, the local division unit 22 divides the data belonging to the root node C11 into the node C21 or the node C22. Further, the local division unit 22 divides the data belonging to the node C22 into the node C31 or the node C32. The same applies to the data belonging to the root node D11 and the data belonging to the root node E11.

By doing so, the local division unit 22 can determine the leaf node of the data belonging to each group (the root nodes B11, C11, D11, and E11). In the example shown in FIG. 5, the nodes B21, B22, C21, C31, C32, D21, D31, D32, E21, E31, E41, and E42 correspond to the leaf nodes. In FIG. 5, the depth of each leaf node is indicated by a numeral. For example, the depth of the leaf node B21 is "1".

The score calculation unit 13 calculates the score using the depths of the leaf nodes B21, B22, C21, C31, C32, D21, D31, D32, E21, E31, E41, and E42 thus obtained.

In the Isolation Forest algorithm, the smaller the value of the score (i.e., the shallower the depth to the leaf node), the more likely the data is to be the outlier. Therefore, in the anomaly detection apparatus 1 according to this example embodiment, for example, when the score calculated by the score calculation unit 13 is smaller than a predetermined value, it may be determined that the data is abnormal.

A plurality of tree structures may be created using the global tree structure creation unit 11 and the local tree structure creation unit 12. In this case, the score calculation unit 13 uses an average value of the depths of the leaf nodes to which the data reaches in each tree structure as the score. For example, in a case where two tree structures A and B are used, when the depths of the leaf nodes to which certain data pieces reach are DA and DB, respectively, (DA+DB)/2 can be employed as the score of the certain data pieces.

As described in the background art, the Isolation Forest algorithm creates the binary tree structure using the plurality of data pieces, and divides the plurality of data pieces using the binary tree structure. The Isolation Forest algorithm uses the path length from the root node to the leaf node as the score, and determines that the smaller the score (the shallower the depth), the more likely the data is to be the outlier (abnormal data).

However, when the Isolation Forest algorithm is used, there is a problem that the expected result cannot be obtained if the distribution of data is unbalanced. More specifically, in the Isolation Forest algorithm, features (parameters) and thresholds of data to be divided are randomly determined to create the binary tree structure. For this reason, in the case of unbalanced data including a majority data group and a minority data group, data included in the minority data group tends to be determined to be as outlier, and as a result, there has been a problem that an anomaly in the data cannot be detected as expected.

Figure 6:
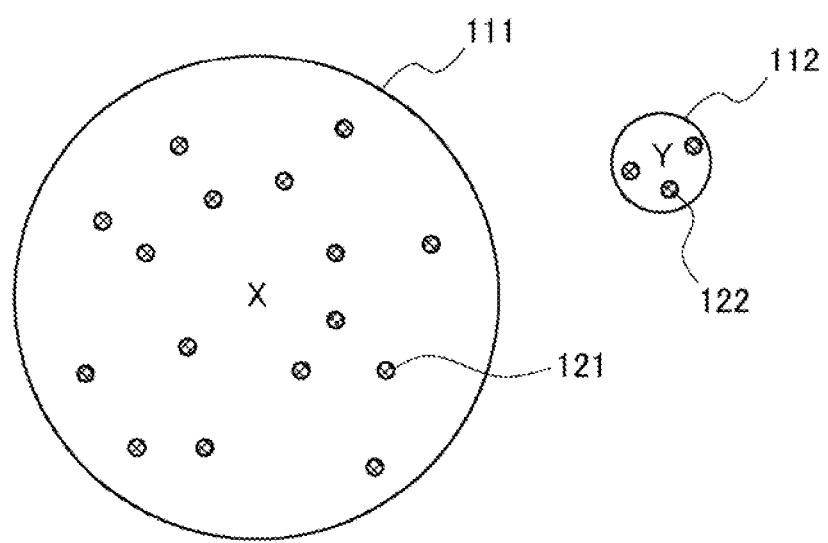
FIG. 6 shows a case in which a distribution of data is unbalanced.

For example, the data group shown in FIG. 6 includes a plurality of data pieces 121 and 122, and these pieces of data are unbalanced data including a majority data group 111 and a minority data group 112. When the Isolation Forest algorithm is applied to such data groups, the data pieces 122 included in the minority data group 112 tend to be determined to be the outliers. Thus, when the Isolation Forest algorithm is applied to unbalanced data, there is a problem that an anomaly in the data cannot be detected as expected.

To address this issue, in the anomaly detection apparatus 1 according to this example embodiment, the global tree structure creation unit 11 creates the global tree structure for dividing the plurality of data pieces into the plurality of groups. The local tree structure creation unit 12 creates the local tree structure for further dividing the data belonging to each group divided by the global tree structure creation unit 11. Then, the score calculation unit 13 calculates the score indicating the anomaly level of the plurality of data pieces using the depth from the root node to the leaf node of the local tree structure created by the local tree structure creation unit 12.

That is, in the anomaly detection apparatus 1 according to this example embodiment, before the local tree structure is created by the local tree structure creation unit 12, the global tree structure is created in advance by the global tree structure creation unit 11. Then, the local tree structure is created for the data belonging to the leaf node (the group) of the global tree structure. By creating the global tree structure in advance in this manner, even when the distribution of data is unbalanced, the unbalanced data group can belong to each group (the leaf node) of the global tree structure. Specifically, the data pieces 122 included in the minority data group 112 shown in FIG. 6 can belong to the group (leaf node) of the global tree structure. Therefore, the local tree structure can be appropriately created for the minority data group 112. For this reason, even when the distribution of the data is unbalanced, an anomaly can be appropriately detected.

According to the disclosure of this example embodiment described above, it is possible to provide an anomaly detection apparatus, an anomaly detection method, and a program capable of appropriately detecting an anomaly even when a distribution of data is unbalanced.

Second Example Embodiment

Figure 7:
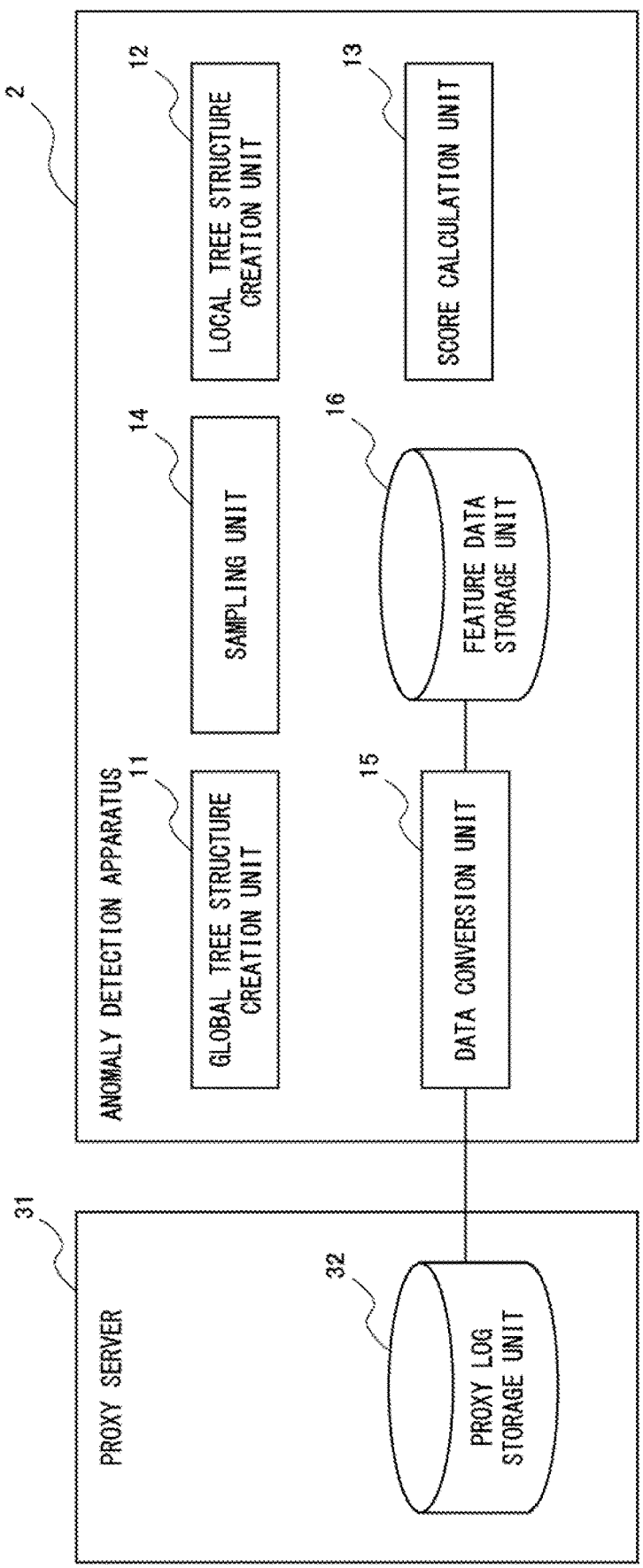
FIG. 7 is a block diagram for explaining an anomaly detection apparatus according to a second example embodiment.

Next, a second example embodiment of the present disclosure will be described. In the second example embodiment, a case where the present disclosure is applied to a log analysis of a proxy server will be described. FIG. 7 is a block diagram for explaining an anomaly detection apparatus according to this example embodiment. Since a basic configuration and an operation of the anomaly detection apparatus 2 according to this example embodiment are the same as those of the anomaly detection apparatus 1 described in the first example embodiment, the same components are denoted by the same reference signs, and repeated description is omitted as appropriate.

As shown in FIG. 7, the anomaly detection apparatus 2 according to this example embodiment includes a global tree structure creation unit 11, a local tree structure creation unit 12, a score calculation unit 13, a sampling unit 14, a data conversion unit 15, and a feature data storage unit 16. A proxy server 31 is connected to the anomaly detection apparatus 2. A proxy log storage unit 32 of the proxy server 31 stores proxy logs of the proxy server 31.

The data conversion unit 15 converts the proxy log supplied from the proxy log storage unit 32 into feature data to be used for anomaly detection processing. FIG. 8 is a table showing an example of proxy log data. FIG. 9 is a table showing an example of the feature data. For example, the data conversion unit 15 converts the proxy log data shown in FIG. 8 into the feature data shown in FIG. 9 (domain, POST rate, the number of accesses).

In the example shown in FIG. 9, a rate at which a request method is a POST line (POST rate) and the total number of lines (the number of accesses) are calculated for each domain. For example, as other features, the number of transmission bytes (a minimum value, a maximum value, and an average value), the number of reception bytes (a minimum value, a maximum value, and an average value), the number of access clients, a distribution of response codes (e.g., what percentage is "200"?), and the like may be used.

The feature data storage unit 16 stores the feature data converted by the data conversion unit 15. The feature data stored in the feature data storage unit 16 is used for the anomaly detection processing in the anomaly detection apparatus 2.

The global tree structure creation unit 11 creates a global tree structure for dividing the feature data stored in the feature data storage unit 16 into a plurality of groups. Specifically, the global tree structure creation unit 11 uses all of the feature data stored in the feature data storage unit 16 as inputs and randomly selects a dimension (a parameter) and a threshold of the division to create the binary tree structure. The division is performed until the number of leaf nodes (groups) of the generated binary tree structure becomes a specified number or the depth of the leaf nodes (groups) becomes a predetermined depth. The details of the global tree structure creation unit 11 are the same as those described in the first example embodiment.

The sampling unit 14 extracts data used when the local tree structure is created by the local tree structure creation unit 12. The sampling unit 14 extracts the data for each group (leaf node) of the global tree structure. At this time, the sampling unit 14 extracts a predetermined number of data pieces from the groups (leaf nodes) of the global tree structure. The sampling unit 14 may extract the same number of data pieces from the data divided into each group (leaf node) of the global tree structure.

The local tree structure creation unit 12 further divides the data included in each group (leaf node) of the global tree structure to create a local tree structure. The local tree structure creation unit 12 takes data extracted from each group by the sampling unit 14 as an input, randomly selects a dimension (parameter) and a threshold of division, and creates a binary tree structure for each group. At this time, the local tree structure creation unit 12 may create the local tree structure for each group using a part of the data extracted at random for each group. The same number of data pieces may be extracted for each group to create the local tree structure. The details of the local tree structure creation unit 12 are the same as those described in the first example embodiment.

The score calculation unit 13 calculates a score indicating an anomaly level of a plurality of data pieces using the depth from a root node to the leaf node of the local tree structure created by the local tree structure creation unit 12. The details of the score calculation unit 13 are the same as those described in the first example embodiment.

Next, an operation of the anomaly detection apparatus 2 according to this example embodiment will be described.

Figure 10:
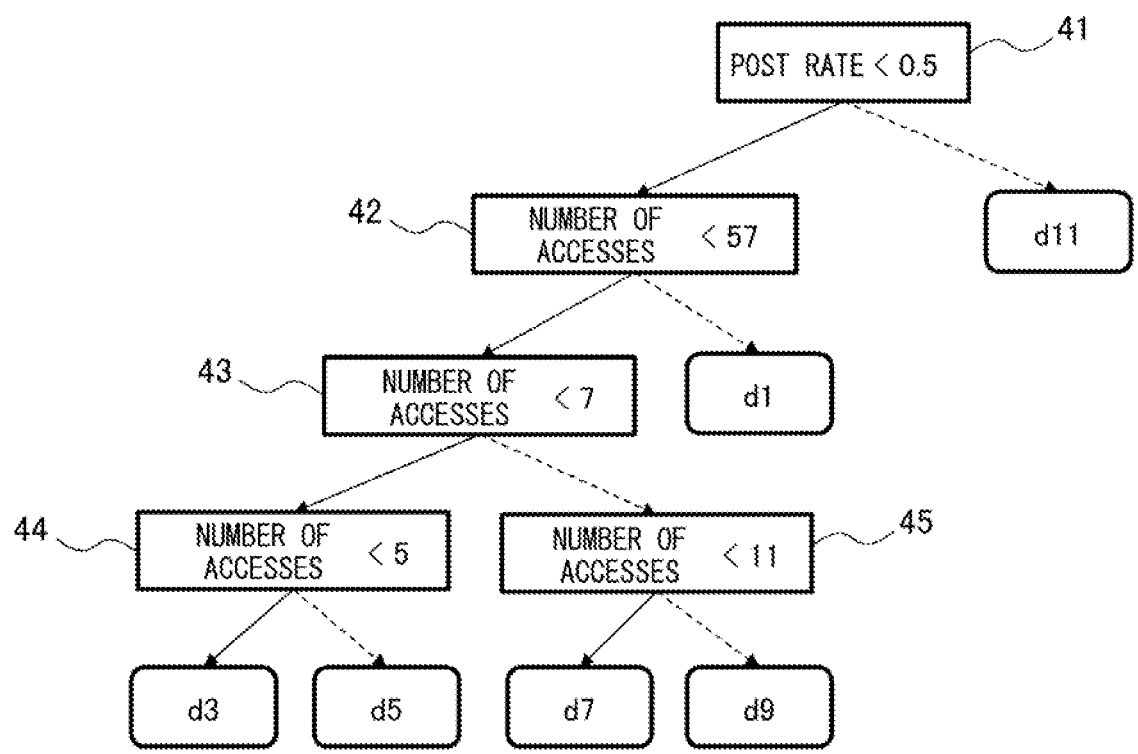
FIG. 10 is a diagram for explaining an anomaly detection operation according to a comparative example.

First, as a comparative example, an operation when the present disclosure is not applied will be described with reference to FIG. 10. In FIG. 10, in order to simplify the explanation, a description will be given of a case where 50% of data shown in FIG. 9 (domains d1, d3, d5, d7, d9, and d11) is sampled to create the binary tree structure.

The binary tree structure shown in FIG. 10 is created using the Isolation Forest algorithm. The features of the data used here are the POST rate and the number of accesses, and these thresholds are average values of a minimum value and a maximum value of the data included in each node.

For example, a node 41 includes data of the domains d1, d3, d5, d7, d9, and d11, and since the minimum value of the POST rate is "0" and the maximum value thereof is "1", the threshold is set to "0.5". For example, a node 42 includes data of the domains d1, d3, d5, d7, and d9, and since the minimum value of the number of accesses is "4" and the maximum value thereof is "110", the threshold is set to "57". The same applies to branching conditions of other nodes.

As shown in FIG. 10, the branching condition of the node 41 is "POST rate <0.5". Thus, the data of the domains d1, d3, d5, d7, and d9 is branched into the node 42, and the data of the domain d11 is branched into the leaf node (in the following description, the data of the domain d11 is also referred to as leaf node d11 for convenience. The same applies to other leaf nodes). In FIG. 10, arrows in the case where the condition is satisfied are represented by solid lines, while arrows in the case where the condition is not satisfied are represented by broken lines.

The branching condition of the node 42 is "the number of accesses <57". Thus, the data of the domains d3, d5, d7, and d9 is branched into a node 44, and the data of the domain d1 is branched into the leaf node d1. The branching condition of a node 43 is "the number of accesses <7". Thus, the data of the domains d3 and d5 is branched into the node 44, and the data of the domains d7 and d9 is branched into the node 45.

The branching condition of the node 44 is "the number of accesses <5". Thus, the data of the domain d3 is branched into a leaf node d3, and the data of the domain d5 is branched into a leaf node d5. The branching condition of the node 45 is "the number of accesses <11". Thus, the data of the domain d7 is branched into a leaf node d7, and the data of the domain d9 is branched into a leaf node d9.

In the comparative example shown in FIG. 10, since the distribution of the POST rates is unbalanced (see FIG. 9), a binary tree structure is created in which minority data (data of the domain d11) having a high POST rate is blindly determined to be an outlier. For this reason, an outlier in a majority of domains (d1, d3, d5, d7, d9) with a low POST rate is less likely to be detected.

That is, since there are generally fewer domains with POST requests, outliers in domains without POST requests are less likely to be detected. In the case of a request to an external site, a majority of domains have one "access client number", so a rare domain with a small number of users is likely to be determined as normal.

As described above, in the case where the present disclosure is not applied, data included in a minority data group tends to be determined to be an outlier when a binary tree structure is created for unbalanced data including a majority data group and a minority data group. Therefore, an anomaly in the data cannot be detected as expected.

Next, an operation of the anomaly detection apparatus 2 according to this example embodiment (an operation in the case where the present disclosure is applied) will be described with reference to FIGS. 11 and 12.

First, the global tree structure creation unit 11 creates the global tree structure for dividing the feature data (all data pieces of the domains d1 to d12) stored in the feature data storage unit 16 into the plurality of groups. In the example shown in FIG. 11, data is divided until the number of data pieces included in one group (leaf node) becomes six or less.

Figure 11:
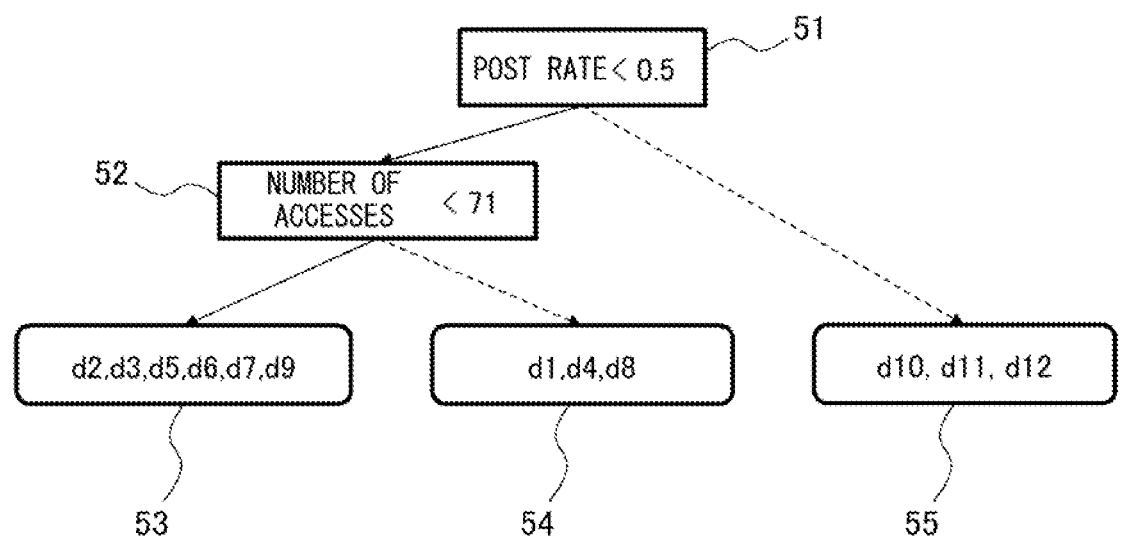
FIG. 11 is a diagram for explaining an anomaly detection operation of the anomaly detection apparatus according to the second example embodiment.

That is, as shown in FIG. 11, the branching condition of a node 51 is "POST rate <0.5". Therefore, the data of the domains d1 to d9 is branched into a node 52, and the data of the domains d10 to d12 is branched into a group (leaf node) 55.

The branching condition of the node 52 is "the number of accesses <71". Thus, the data of the domains d2, d3, d5, d6, d7, and d9 is branched into a group (leaf node) 53, and the data of the domains d1, d4, and d8 is branched into a group (leaf node) 54.

By creating such a global tree structure, the feature data (all data pieces in the domains d1 to d12) can be divided into the groups 53 to 55.

After that, the sampling unit 14 samples three data pieces from each group 53 to 55. The local tree structure creation unit 12 creates the local tree structure using the data sampled from each group 53 to 55.

Specifically, in the group 53 shown in FIG. 11, the local tree structure is created using the data of the domains d2, d5, and d7. In the group 54, the local tree structure is created using the data of the domains d1, d4, and d8. In the group 55, the local tree structure is created using the data of the domains d10, d11 and d12. Since the number of data pieces in the groups 54 and 55 is three, the groups 54 and 55 use all the data pieces included in each of the groups 54 and 55.

Figure 12:
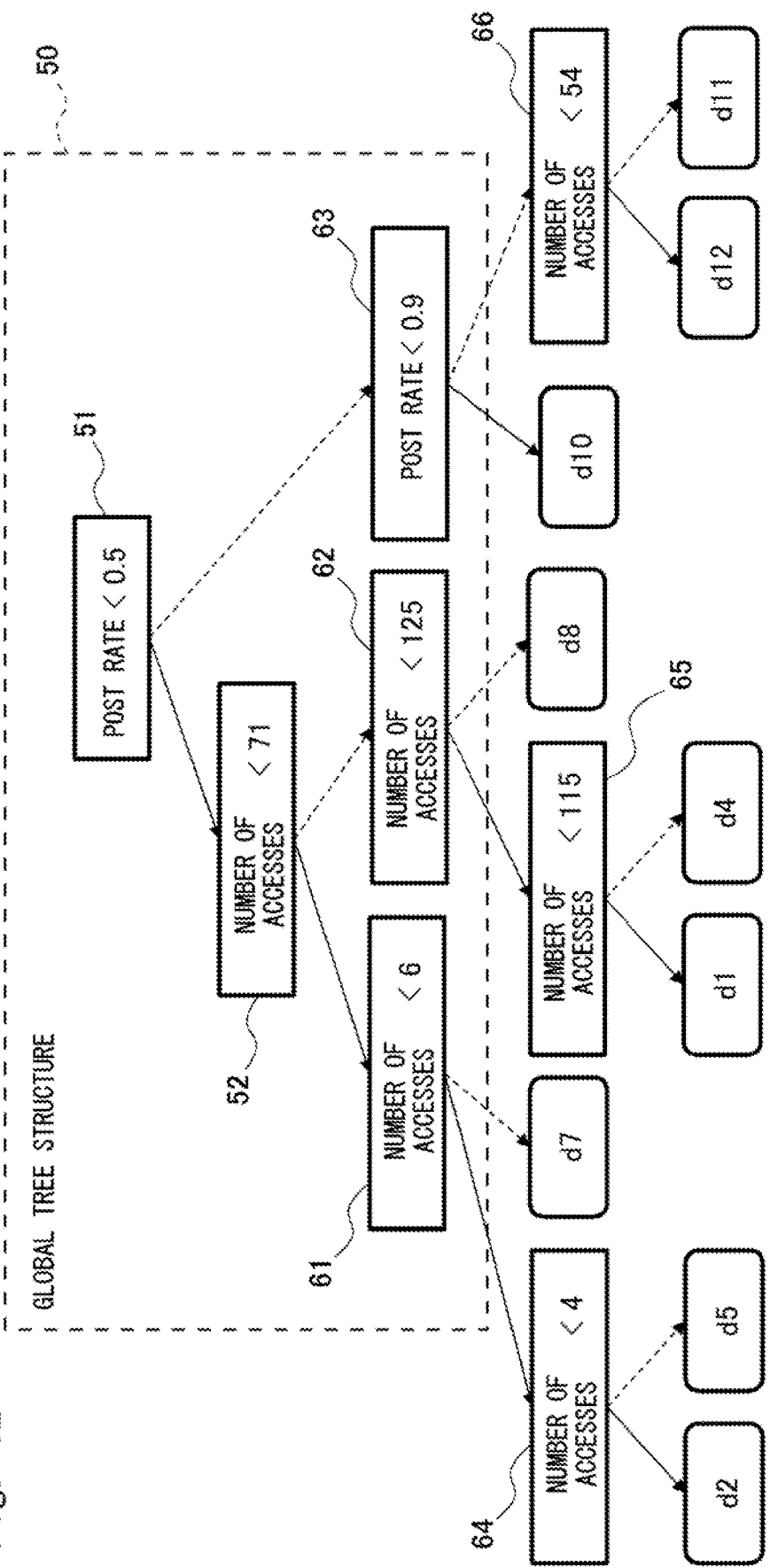
FIG. 12 is a diagram for explaining an anomaly detection operation of the anomaly detection apparatus according to the second example embodiment.

The global tree structure 50 shown in FIG. 12 corresponds to the global tree structure shown in FIG. 11.

A node (a root node) 61 shown in FIG. 12 corresponds to the group (leaf node) 53 shown in FIG. 11. As shown in FIG. 12, the branching condition of the node 61 is "the number of accesses <6". Thus, the data of the domains d2 and d5 is branched into a node 64, and the data of the domain d7 is branched into the leaf node d7. The branching condition of the node 64 is "the number of accesses <4". Thus, the data of the domain d2 is branched into a leaf node d2, and the data of the domain d5 is branched into the leaf node d5. By doing so, the local tree structure creation unit 12 can create the local tree structure (i.e., the local tree structure including the nodes 61 and 64 and leaf nodes d2, d5, and d7) corresponding to the group 53 (see FIG. 11).

A node (a root node) 62 shown in FIG. 12 corresponds to the group (the leaf node) 54 shown in FIG. 11. As shown in FIG. 12, the branching condition of the node 62 is "the number of accesses <125". Thus, the data of the domains d1 and d4 is branched into a node 65, and the data of the domain d8 is branched into a leaf node d8. The branching condition of the node 65 is "the number of accesses <115". Thus, the data of the domain d1 is branched into the leaf node d1, and the data of the domain d4 is branched into a leaf node d4. By doing so, the local tree structure creation unit 12 can create the local tree structure (i.e., the local tree structure including the nodes 62 and 65 and leaf nodes d1, d4, and d8) corresponding to the group 54 (see FIG. 11).

A node (a root node) 63 shown in FIG. 12 corresponds to the group (leaf node) 55 shown in FIG. 11. As shown in FIG. 12, the branching condition of the node 63 is "POST rate <0.9". Thus, the data of the domain d10 is branched into the leaf node d10, and the data of the domains d11 and d12 is branched into a node 66. The branching condition of the node 66 is "the number of accesses <54". Thus, the data of the domain d12 is branched into the leaf node d12, and the data of the domain d11 is branched into the leaf node d11. By doing so, the local tree structure creation unit 12 can create the local tree structure (i.e., the local tree structure including the nodes 63 and 66 and leaf nodes d10, d11, and d12) corresponding to the group 55 (see FIG. 11).

The score calculation unit 13 calculates the score using the depths (the depths from the root node to the leaf node) of the leaf nodes d1, d2, d4, d5, d7, d8, d10, d11, and d12 thus obtained.

As described above, in the anomaly detection apparatus according to this example embodiment, data having unbalanced features (i.e., data of the domains d10, d11, and d12 with high POST rates) can be allocated to the group (the leaf node) 55 of the global tree structure (see FIG. 11). Other data can also be allocated to other groups (the leaf nodes) 53 and 54 of the global tree structure. The local tree structure is created for each group 53 to 55. Thus, an outlier can be detected in each group 53 to 55.

Specifically, in the anomaly detection apparatus according to this example embodiment, since the data having the unbalanced features are allocated to the group (the leaf node) of the global tree structure, it is possible to prevent the data having the unbalanced features from being determined blindly as an outlier. In other words, in the examples shown in FIGS. 11 and 12, the group having the high POST rate is created in the leaf node 55 of the global tree structure. By creating the local tree structure for the group (the leaf node) 55 having the high POST rate, an outlier in the data having a high POST rate can be detected.

Note that the present disclosure is not limited to the example embodiments described above, and may be appropriately modified without departing from the scope. For example, the anomaly detection apparatuses 1 and 2 according to the present disclosure may include a plurality of the score calculation units 13. When the plurality of score calculation units 13 are included, a statistic of the scores (i.e., a statistic of the score indicating the anomaly level of the plurality of data pieces) calculated by the plurality of score calculation units 13 may be used as the score indicating an anomaly. In this case, an anomaly can be detected from various points of view for a large number of data pieces.

In the above example embodiments, the present disclosure has been described as a hardware configuration, but the present disclosure is not limited thereto. According to the present disclosure, the anomaly detection processing can also be implemented by causing a CPU (Central Processing Unit), which is a processor, to execute a computer program.

That is, a global tree structure for dividing a plurality of data pieces into a plurality of groups is created, and a local tree structure for further dividing the data pieces divided into each of the plurality of groups into a plurality of groups is created. The score indicating the anomaly level of the plurality of data pieces is calculated using the depth from the root node to the leaf node of the local tree structure. A program for executing such anomaly detection processing may be executed by the computer.

Figure 13:
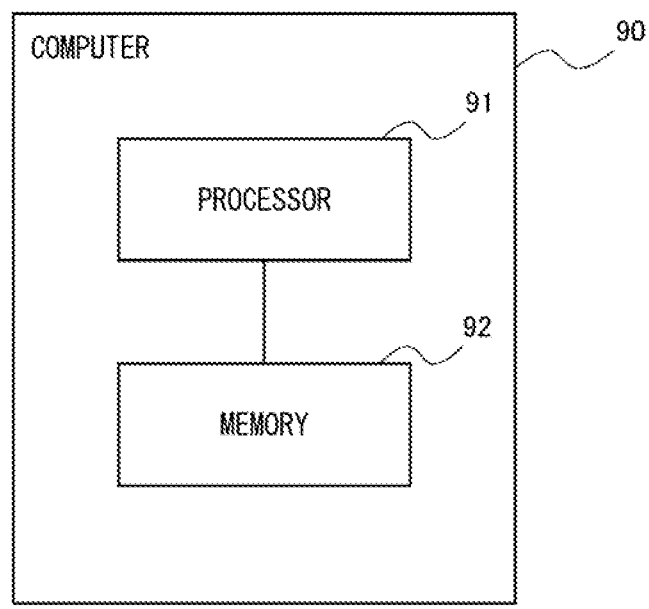
FIG. 13 is a block diagram showing a computer for executing an anomaly detection processing program according to the present disclosure.

FIG. 13 is a block diagram showing a computer for executing the anomaly detection processing program according to the present disclosure. As shown in FIG. 13, a computer 90 includes a processor 91 and a memory 92. The program for anomaly detection processing is stored in the memory 92. The processor 91 reads the program for anomaly detection processing from the memory 92. Then, by the processor 91 executing the program for the anomaly detection processing, the anomaly detection processing according to the present disclosure described above can be executed.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the above example embodiments, the present disclosure is not limited to the configuration of the above example embodiments, and obviously includes various modifications, changes, and combinations that can be made by a person skilled in the art within the scope of the claimed disclosure.

REFERENCE SIGNS LIST 1, 2 ANOMALY DETECTION APPARATUS
11 GLOBAL TREE STRUCTURE CREATION UNIT
12 LOCAL TREE STRUCTURE CREATION UNIT
13 SCORE CALCULATION UNIT
14 SAMPLING UNIT
15 DATA CONVERSION UNIT
16 FEATURE DATA STORAGE UNIT
21 GLOBAL DIVISION UNIT
22 LOCAL DIVISION UNIT
31 PROXY SERVER
32 PROXY LOG STORAGE UNIT
90 COMPUTER
91 PROCESSOR
92 MEMORY

What is claimed is:

1. An anomaly detection apparatus comprising:
a processor; and
a memory storing instructions executable by the processor to:
create a first binary tree structure for dividing a plurality of data pieces into a plurality of groups;
create a second binary tree structure for further dividing the data pieces divided into the plurality of groups for each of the plurality of groups;
calculate a score indicating an anomaly level of the plurality of data pieces using a depth from a root node to a leaf node of the second binary tree structure; and
detect an anomaly based on the calculated score, wherein
the plurality of data pieces are unbalanced data including a majority data group and a minority data group,
the first binary tree structure is created such that the minority data group is included in a predetermined group that is a leaf node of the first binary tree structure, and
usage of the first and second binary tree structures in calculation of the score provides for detection of the anomaly even though the plurality of data pieces are unbalanced.

2. The anomaly detection apparatus according to claim 1, wherein
the score is calculated by:
dividing the plurality of data pieces into the plurality of groups using the first binary tree structure;
dividing the data pieces divided into the plurality of groups for each of the plurality of groups using the second binary tree structure;
calculating the depth from the root node to the leaf node as the score.

3. The anomaly detection apparatus according to claim 1, wherein
the first binary tree structure is created by dividing the plurality of data pieces into the plurality of groups so that a number of data pieces belonging to each of the groups becomes a predetermined threshold or more.

4. The anomaly detection apparatus according to claim 1, wherein
the leaf node of the first binary tree structure corresponds to the root node of the second binary tree structure.

5. The anomaly detection apparatus according to claim 1, wherein the instructions are executable by the processor to further:
extract a same number of data pieces from the data pieces divided into each of the groups, wherein
the second binary tree structure is created for the same number of data pieces belonging to each of the groups.

6. The anomaly detection apparatus according to claim 1, wherein
the first binary tree structure is created using all of the plurality of data pieces.

7. The anomaly detection apparatus according to claim 1, wherein
the score indicating the anomaly of the plurality of data pieces is a first score,
a second score indicating the anomaly is calculated for each data piece, yielding a plurality of the second scores respectively corresponding to the plurality of data pieces, and
a statistic of the plurality of the second scores is used as the first score.

8. An anomaly detection method comprising:
creating, by a processor, a first binary tree structure for dividing a plurality of data pieces into a plurality of groups;
creating, by the processor, a second binary tree structure for further dividing the data pieces divided into the plurality of groups for each of the plurality of groups;
calculating, by the processor, a score indicating an anomaly level of the plurality of data pieces using a depth from a root node to a leaf node of the second binary tree structure; and
detecting, by the processor, an anomaly based on the calculated score, wherein
the plurality of data pieces are unbalanced data including a majority data group and a minority data group,
the first binary tree structure is created such that the minority data group is included in a predetermined group that is a leaf node of the first binary tree structure, and
usage of the first and second binary tree structures in calculation of the score provides for detection of the anomaly even though the plurality of data pieces are unbalanced.

9. A non-transitory computer readable medium storing a program executable by a computer to perform an anomaly detection process comprising:
creating a first binary tree structure for dividing a plurality of data pieces into a plurality of groups;
creating a second binary tree structure for further dividing the data pieces divided into the plurality of groups for each of the plurality of groups;
calculating a score indicating an anomaly level of the plurality of data pieces using a depth from a root node to a leaf node of the second binary tree structure; and
detecting an anomaly based on the calculated score, wherein
the plurality of data pieces are unbalanced data including a majority data group and a minority data group,
the first binary tree structure is created such that the minority data group is included in a predetermined group that is a leaf node of the first binary tree structure, and
usage of the first and second binary tree structures in calculation of the score provides for detection of the anomaly even though the plurality of data pieces are unbalanced.

* * * * *